United States Patent
Cornsweet et al.

[11] 3,724,932
[45] Apr. 3, 1973

[54] EYE TRACKER AND METHOD

[75] Inventors: Tom N. Cornsweet, Atherton; Hewitt D. Crane, Portola Valley, both of Calif.

[73] Assignee: Stanford Research Institute, Menlo Park, Calif.

[22] Filed: Apr. 9, 1971

[21] Appl. No.: 132,747

[52] U.S. Cl. .................351/7, 250/206, 250/221, 340/279, 351/6, 351/9, 351/14, 351/16, 351/39
[51] Int. Cl. ...............................................A61b 3/10
[58] Field of Search............351/1, 6, 7, 9, 14, 16, 39; 250/206, 221; 340/279

[56] References Cited

UNITED STATES PATENTS 3,462,604   8/1969   Mason..................................351/6 X
3,473,868   10/1969  Young et al.........................351/7 X Primary Examiner—David Schonberg
Assistant Examiner—Paul A. Sacher
Attorney—Flehr, Hohbach, Test, Albritton & Herbert

[57] ABSTRACT

A technique and apparatus for two dimensional tracking of eye position. An infrared pattern is projected into the eye and measurements taken of the spatial separation of the first and fourth Purkinje reflections, the reflections from the cornea and the back of the eye lens, respectively. Because the centers of curvature of the surfaces of the cornea and lens lie at different distances from the center of rotation of the eye, these reflections move in opposite directions under eye rotation, in either the vertical or the horizontal direction. During translation of the eye in either the vertical or the horizontal direction the spacing or separation between the two Purkinje images does not change. In one embodiment, a rotating scanning disc having a plurality of spaced orthogonal slits is provided and imaging means are provided for imaging the first and fourth Purkinje images of the light source through the orthogonal slits of the scanning disc onto a photomultiplier tube. The time period between pulse outputs of the photomultiplier tube is proportional to the separation of the first and fourth Purkinje images. In another embodiment the two Purkinje images are deflected so as to be incident on photodetectors. The photodetectors and deflecting means are movable so that the two Purkinje images are kept centered on their respective photodetectors. By monitoring the position of the photodetectors and deflecting means an indication is obtained of the separation of the Purkinje images which gives an indication of the orientation of the optic axis of the eye.

16 Claims, 6 Drawing Figures

PATENTED APR 3 1973
3,724,932
SHEET 1 OF 2
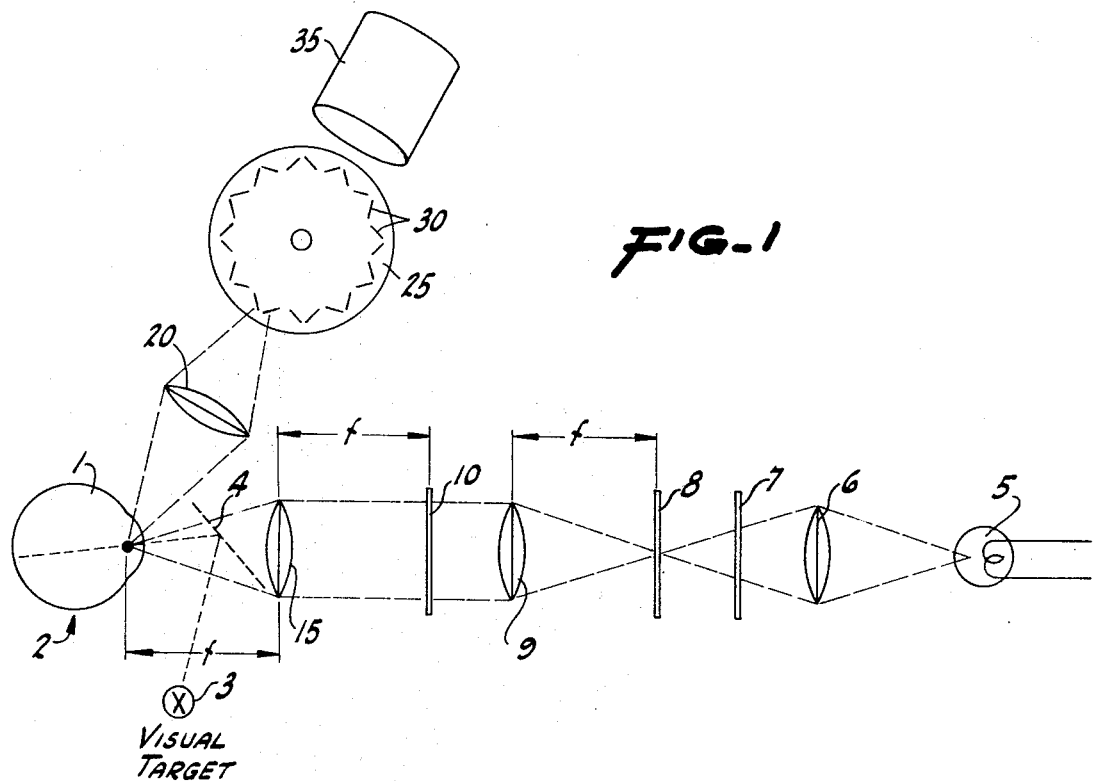
FIG.-1
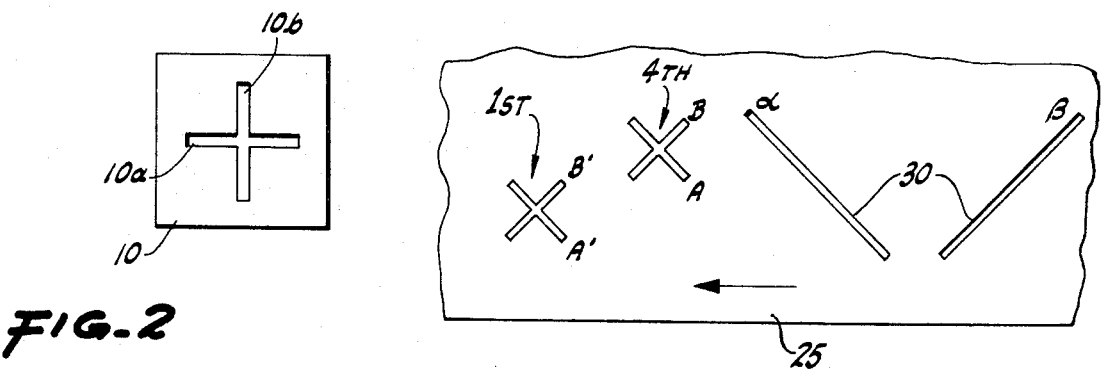
FIG.-2
FIG.-3
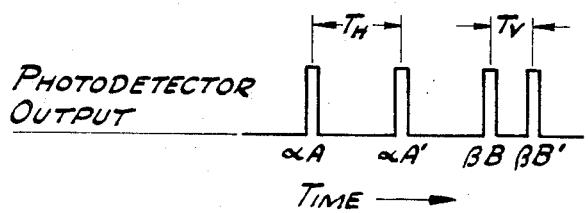
FIG.-4
INVENTORS
TOM N. CORNSWEET
BY HEWITT D. CRANE
Flehr, Hohbach, Veat,
Albritton + Herbert
ATTORNEYS

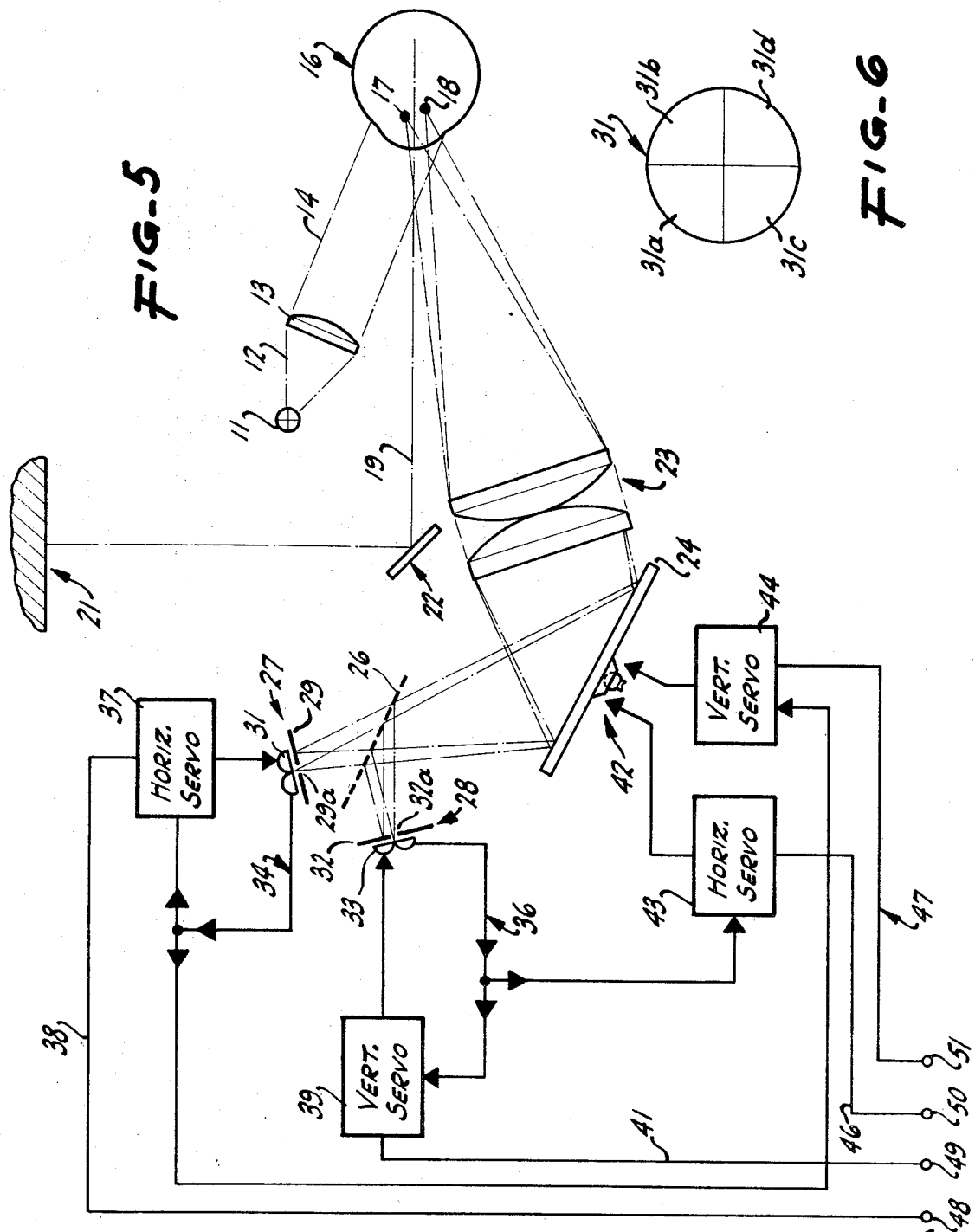

EYE TRACKER AND METHOD

The invention described herein was made in the performance of work under a NASA contract and is subject to the provisions of Section 305 of the National Aeronautics and Space Act of 1958, Public Law 85-568 (72 Stat. 435; 42 U.S.C. 2457)

BACKGROUND OF THE INVENTION

This invention pertains to an eye tracker and more particularly pertains to an eye tracker for continuously tracking orientation of the optic axis of an eye by monitoring Purkinje images formed by reflecting surfaces within the eye.

There are many areas of both research and possibilities for commercial application in which it is desirable to have available electrical signals proportional to the orientation of the optic axis of a human observer's eye. Research on the mechanics of eye movements, on many areas of visual perception and on visual search patterns would all be greatly aided by such a device. Commercial applications include the use of the eye to control other systems. For example, a computer operator might simply look at any one of a number of symbols or locations displayed in front of him and press a button, introducing the value corresponding to that location into the computer. Similarly, a servosystem for controlling a gun or camera could automatically be aimed at whatever object an observer visually was fixating.

The prior art contains many methods for attempting to track eye movement. In one such method a tightly fitting contact lens is attached to the eye and either a light source, a mirror, or a coil of wire is attached to the lens. Movements of the eye can then be monitored by electro-optical tracking or photography. This method has the obvious shortcoming that the lens must fit tightly on the eye, producing some discomfort. Further, in order to get a tight fit, either each lens must be individually constructed to fit the particular observer or the observer's eye must be anesthetized and the lens attached with suction, a difficult and slightly risky procedure.

Another prior art technique for tracking eye movements is the electro-oculogram. This method is based upon the fact that physiological events within any mammalian eye result in the maintenance of a voltage between the cornea and the surrounding tissue, such as the forehead. Therefore, if two electrodes are placed, say, one on the skin above and the other below the eyeball, vertical rotations of the eye will result in corresponding changes in the voltage between the electrodes. A recording of such a voltage is called an electro-oculogram. The accuracy of this technique is limited by many factors, such as the slow changes in the resting potential with time of day, state of adaptation, etc. Further, the electrical noise level resulting from stray bioelectric potential limits the resolution of this technique.

Another prior art eye tracking technique can be described as tracking a feature of the front of the eye. When the eye rotates in its socket, the location of any feature of the front of the eye, such as the iris or a blood vessel on the white, moves accordingly. Therefore, photography or electro-optical tracking of such a feature provides a method of recording eye position. These prior art techniques, however, have not been precise. When the eye rotates horizontally, the front of the eye moves horizontally. If the head moves sideways, however, the eyeball shifts sideways in its socket, and the front of the eye also moves horizontally. Therefore, using these techniques, there is no way to distinguish lateral movements of the eye from rotations of the eye. For example, a rotation of one degree moves the front of the eye through 0.2 mm., and is thus indistinguishable from a lateral shift of 0.2 mm. On the other hand, the visual effects of rotation are drastically different from those of translation. If the object being viewed is 2 meters away, a lateral movement of 0.2 mm. changes the place being looked at by 0.2 mm., while the rotation of 1 degree (which looks the same to the recording device) changes that place by 35 mm. And the farther away the target is, the larger becomes the discrepancy between the effects of lateral and rotational movement. Therefore, when the technique used to record eye movements involves the monitoring of the location of any point on the front of the eye, lateral movements result in artifacts. Since it is impossible to prevent the eye from moving laterally in its socket, the error of these techniques cannot be less than about 15 to 30 minutes of arc (corresponding to lateral shifts of the eye of 0.05 to 0.1 mm.).

Another prior art technique for eye tracking is what is known as an oculometer. The oculometer tracks the corneal reflection and the inside edge of the iris. Because the center of curvature of the cornea is at a somewhat different distance from the center of curvature of the eye than the plane of the iris, these two "landmarks" move with respect to each other under eye rotation but not under translation. What the oculometer basically does is measure the relative position of the corneal reflection with respect to the center of the pupil of the eye. Although it is immune to the effects of translation of the eye it has an inherent problem. This problem is that the iris muscle changes its state, changing the size of the pupil, as a function of a number of factors, such as light intensity, emotional state, state of focus of the eye, etc. While the oculometer might not be bothered directly by changes in the diameter of the pupil, it would be affected by unsymmetrical changes in pupil size. As is well known to those skilled in the art, it is extremely rare to find someone whose pupils contract symmetrically. It is almost always the case that when the pupil changes its size, its center changes position with respect to the eye, just because the iris muscle does not contract exactly symmetrically. Very slight asymmetries in this contraction can cause large errors — a tenth of a millimeter of asymmetry is the equivalent of about a half a degree of error, and normal pupils can change their diameter from 2 to 8 millimeters.

Therefore, what is needed is an improved eye tracker which requires no attachments to the eye and which provides tracking signals much more accurate than ½°, and which is able to distinguish between translation artifacts and rotation of the eye.

BRIEF SUMMARY OF THE INVENTION

Accordingly, it is an object of this invention to provide an improved method and apparatus for eye tracking which requires no attachment to the eye and provides an accuracy better than ½°.

It is another object of this invention to provide an accurate method and apparatus for eye tracking which requires no attachment to the eye and which continuously monitors the orientation of the optic axis of the eye.

Briefly, in accordance with one embodiment of the invention, an eye is flooded with light so that a plurality of Purkinje images are formed by reflecting surfaces within the eye. Two of the Purkinje images are monitored by imaging them on a rotating disc. The rotating disc has a plurality of orthogonal slits through which the Purkinje images are imaged on a photodetector. The time duration between pulse outputs of the photodetector is proportional to the spatial separation of the Purkinje images.

BRIEF DESCRIPTION OF THE DRAWING

FIG. 1 is a block diagram of an eye tracker in accordance with this invention.

FIG. 2 is an elevation of a stop of FIG. 1 for imaging the light source on the eye.

FIG. 3 is a diagrammatic illustration showing the manner in which the scanning disc with the orthogonal slits therein rotates past the first and fourth Purkinje images.

FIG. 4 is a diagram of the output of the photodetecting means of FIG. 1 showing the manner in which the time duration between pulses is proportional to the spatial separation of the first and fourth Purkinje images.

FIG. 5 is a diagrammatic illustration of another embodiment of an eye tracker utilizing a pivoted mirror and movable photodetectors.

FIG. 6 is a diagrammatic view of one of the photodetectors of FIG. 5.

DESCRIPTION OF THE PREFERRED EMBODIMENTS

FIG. 1 is a diagrammatic illustration of an eye tracker in accordance with this invention. An eye 1 is provided situated approximately at an eye station 2. The eye 1 is conveniently looking at a visual target 3 and may view the visual target 3 through reflections from a dichroic mirror 4. A dichroic mirror such as dichroic mirror 4 is a mirror which reflects visible light while transmitting infrared light. A light source 5 is provided and a condensing lens 6 directs light from the source 5 through a filter 7 to a stop 8. The filter 7 in one embodiment of the invention passes light having wave lengths from about 850 to 1,050 nanometers. Thus the light passing through the filter 7 is invisible and will not when directed into the eye 1 interfere with visual tasks. Thus the image of the source 5 in the plane of the stop 8 is collimated by a lens 9 and passes through another stop 10. As shown in FIG. 2 the stop 10 contains two orthogonal slits generally indicated by reference numerals 10a and 10b. A lens 15 collimates the light from the slits 10a and 10b and images stop 8 through the dichroic mirror 4 in the plane of the pupil of the eye 1.

The reflected components of light from the cornea and the rear surface of the lens of the eye 1 form virtual and real images, respectively of the stop 10. The light radiating from these images is imaged by viewing lens 20 in the plane of a scanning disc 25. The scanning disc 25 contains a plurality of pairs of orthogonal slits generally indicated by reference numeral 30. In accordance with one embodiment of this invention the scanning disc 25 contains 90 pairs of orthogonal slits 30 and is rotated at approximately 6,000 rpm. The two Purkinje images are thus scanned by the scanning disc 25 9,000 times per second. Light forming the two Purkinje images passes through the orthogonal slits 30 and falls on a photodetector 35 which may conveniently be a photomultiplier tube.

Refering now to FIG. 3, there is shown an enlarged portion of the scanning disc 25 illustrating one pair of orthogonal slits 30 and first and fourth Purkinje images falling on the scanning disc 25 and illustrating the manner in which the orthogonal slits 30 scan the first and fourth Purkinje images. In FIG. 3, the first and fourth Purkinje images are displaced with respect to each other, indicating in this case a general condition where the eye is pointing upward and to the right at an arbitrary reference position. As the scanning disc 25 rotates, light will strike the photodetector as slit $\alpha$ crosses line A of the fourth Purkinje image and then as slit $\alpha$ crosses line A' of the first Purkinje image. Then as slit $\beta$ crosses line B of the fourth Purkinje image light strikes the photodetector and then light strikes the photodetector again as slit $\beta$ crosses the line B' of the first Purkinje image.

The output of the photodetector 35 which in this case as indicated before is a photomultiplier tube is shown in a graph in FIG. 4 wherein the photodetector output is plotted as a function of time. Thus four pulses will appear at the output of the photodetector. The first of these pulses is labeled $\alpha A$ and corresponds to the light falling on the photodetector as the slit $\alpha$ crosses the line A of the fourth Purkinje image. The next output of the photodetector is labeled $\alpha A'$ and corresponds to the light reaching the photodetector as the slit $\alpha$ crosses the line A' of the first Purkinje image. The next output of the photo detector is labeled $\beta B$ and corresponds to the light reaching the photodetector as the split $\beta$ crosses the line B of the fourth Purkinje image. Similarly, the next output of the photo detector is labeled $\beta B'$ and corresponds to the light reaching the photodetector as the slit $\beta$ crosses the line B' of the first Purkinje image. Thus the interval from $\alpha A$ to $\alpha A'$ which is labeled $T_h$ serves as an indication of the horizontal separation of the first and fourth Purkinje images and the interval between the pulses labeled $\beta B$ and $\beta B'$ which is labeled $T_v$ serves as an indication of the vertical separation of the first and fourth Purkinje images. Suitable electronics are of course provided for continuously converting the time intervals $T_v$ and $T_h$ into proportional voltages. As previously discussed, during translation of the eye both the first and fourth Purkinje images move the same amount so that their spatial separation in both a vertical and horizontal sense does not change. However, when the eye rotates the spatial separation between the first and fourth Purkinje images changes and the change in separation of the two images is useful as an indication of the amount of rotation of the eye. Thus, a change in the time period $T_h$ is indicative of horizontal rotation of the eye and the amount of horizontal rotation can be ascertained by measuring the value $T_h$ as it changes. Similarly, the time period $T_v$ serves as an indication of the vertical separation of the first and fourth Purkinje images. A change in the value of $T_v$ indicates vertical rotation of the eye and the amount of vertical rotation of the eye can be ascertained by tracking or following the changing values of $T_v$.

Referring now to FIG. 5, there is shown a diagrammatic illustration of another embodiment of an eye tracker in accordance with this invention. A light source 11 produces a beam of light 12 which is collimated by a lens 13 into a collimated beam of light 14 for flooding the eye 16 with light. Portions of the collimated beam of light 14 are reflected by the various reflecting surfaces within the eye. In particular, a first Purkinje image 17 is formed in about the plane of the pupil of the eye by reflection of light from the cornea of the eye and a fourth Purkinje image 18 is formed also in about the plane of the pupil of the eye by reflection of light from the rear surface of the lens of the eye. In accordance with an embodiment of this invention the light source 11 may be a source of infrared light so that the collimated beam of light 14 is infrared and does not interfere with visual perception of the eye 16. The eye 16 may be viewing along its visual axis 19 a fixation point or display 21 whose image may be coupled to the optic axis 19 by means such as a mirror 22.

The first Purkinje image 17 and the fourth Purkinje image 18 are imaged by a lens assembly 23 onto a reflecting surface or mirror 24. Both the first Purkinje image and the fourth Purkinje image are reflected by the reflecting surface or mirror 24 to a beamsplitter 26 which both transmits the images to a detector station 27 and reflects the images to detector station 28. The detector station 27 includes an apertured plate 29 having an aperture 29a and a multiple field photodetector 31 having four quadrants 31a through 31d as in FIG. 6. In a similar fashion the detector station 28 includes an apertured plate 32 having an aperture 32a and a multiple field photodetector 33. The apertured plate 29 serves to mask the multiple field photodetector 31 from the first Purkinje image, allowing the fourth Purkinje image to be imaged through the aperture 29a on the multiple field photodetector 31. Similarly, the apertured plate 32 serves to mask the multiple field photodetector 33 from the fourth Purkinje image, allowing the first Purkinje image to be imaged on the multiple field photodetector 33 through the aperture 32a.

The multiple field photodetectors 31 and 33 each have four quadrants with the center of the quadrants aligned with the apertures 29a and 32a respectively, and have electrical output circuits 34 and 36 respectively. The multiple field photodetectors 31 and 33 generate electrical outputs on their electrical output circuits indicative of the imbalance of the images falling thereon with respect to the four quadrants of the photodetectors. For example, if there is an imbalance between the upper two quadrants and lower two quadrants of a photodetector, that is an indication that the image falling thereon is shifted with respect to the photodetector in a vertical direction. Similarly, if there is an imbalance between the right and left pairs of quadrants of a photodetector, that is an indication that the image falling on the photodetector is shifted in a horizontal direction with respect to the axis of the photodetector.

A horizontal servosystem 37 is provided for shifting the detector station 27 either to the right or to the left in a horizontal direction. The horizontal servosystem 37 receives position information over the electrical output circuit 34 of the multiple field photodetector 31 so that the horizontal servosystem 37 moves the detector station 27 to the right or left in a horizontal direction in order to eliminate any imbalance between the light images falling on the right and left pairs of quadrants of the multiple field photodetector 31. The horizontal servosystem 37 furnishes a position signal on a circuit 38 which depends upon the horizontal position of the fourth Purkinje image and is proportional to the horizontal separation between the first and fourth Purkinje images.

A vertical servosystem 39 is provided for adjusting the position of the detector station 28 up and down in a vertical direction. The vertical servosystem 39 functions similarly to the servosystem 37 and receives as input information signals over the electrical output circuit 36 of the multiple field photodetector 33 which are proportional to any imbalance in the images falling on the upper and lower pairs of quadrants of the multiple field photodetector 33. The vertical servosystem 39 has associated therewith a circuit 41 on which signals are present which depend upon the vertical position of the first Purkinje image. The reflecting surface or mirror 24 is pivoted by a pivot assembly 42 to rotate both in a vertical and in a horizontal direction. A horizontal servosystem 43 is provided for rotating the mirror 24 in a horizontal direction and a vertical servosystem 44 is provided for rotating the mirror 24 in a vertical direction. The horizontal servosystem 43 receives as an input the position information on the electrical output circuit 36 of the multiple field photodetector 33 as to the imbalance between the horizontal pairs of quadrants of the multiple field photodetector 33 which corresponds to movement of the first Purkinje image with respect to the multiple field photodetector 33. The horizontal servosystem provides an output signal on a circuit 46 which depends upon the horizontal position of the first Purkinje image and is proportional to a combination rotation and translation of the eye. In a similar manner the vertical servosystem 44 receives as an input position information from the electrical output circuit 34 of the multiple field photodetector 31 of the vertical imbalance between the vertical pairs of quadrants of the photodetector which corresponds to vertical movement of the fourth Purkinje image. The vertical servosystem 44 has a circuit 47 on which is present a signal depending upon the vertical position of the fourth Purkinje image.

Thus the signals on the circuit 38, 41, 46 and 47 which terminate in the terminals 48 through 51, respectively, contain all the information necessary to describe the orientation of the optic axis of the eye 16. It might be mentioned in passing that the term optic axis as used herein does refer to the optic axis of the eye and not the visual axis. For most individuals the optic axis and the visual axis differ by on the average 5 degrees, and the difference between the two is constant for any given individual. The signals present on terminals 48 through 51 can also be manipulated so as to determine whether or not the eye is undergoing rotation or translation. As previously mentioned, during translation of the eye, spacing between the first and fourth Purkinje images remains approximately constant. It is during rotation that the distance between the first and fourth Purkinje image changes. Therefore, for example, if the change in signal on terminal 48 corresponding to the horizontal movement of the fourth Purkinje image and the change in signal on the terminal 50 corresponding to horizontal movement of the first Purkinje image are the same, then it is known that the eye is undergoing horizontal translation rather than horizontal rotation. Similar considerations apply to the vertical signals on terminals 49 and 51 indicative of vertical movements of the first and fourth Purkinje images, respectively.

Thus what has been described is an improved non-contacting accurate eye tracker for tracking rotational movements of an eye. The eye tracker in accordance with this invention tracks the vertical and horizontal spatial separation of the first and fourth Purkinje images to separate rotational movements of the eye from translational movements of the eye and develop electrical signals indicative of the vertical and horizontal spatial separation of the first and fourth Purkinje images.

We claim:

1. A method of tracking rotational movement of an eye having a lens and a cornea where the eye is capable of rotational and translational movements comprising the steps of directing collimated light into the eye whereby first and fourth Purkinje images are formed by reflection from the eye cornea and lens respectively, imaging the first and fourth Purkinje images on detecting means and continuously measuring the spatial separation between the first and fourth Purkinje images whereby changes in such spatial separation are proportional to rotational movements of the eye.

2. A method in accordance with claim 1 wherein collimated infrared light is directed into the eye whereby the eye is not aware of the presence of such light.

3. an eye tracker for tracking rotational movements of an eye of the type having a pupil, a cornea and a lens where the eye is capable of both rotational and translational movements comprising light source means for generating a light beam, light source imaging means for coupling said light beam into the eye whereby first and fourth Purkinje images are formed by reflections of said light beam from the cornea and eye lens, respectively, detecting means, means for imaging said first and fourth Purkinje images on said detecting means, said detecting means generating signals proportional to the spatial separation of said first and said fourth Purkinje images.

4. An eye tracker in accordance with claim 3 wherein said light beam generated by said lights source means comprises an infrared light beam whereby said light beam does not interfere with normal visual functions of the eye.

5. An eye tracker in accordance with claim 3 wherein said light source imaging means includes a stop having orthogonal slits whereby said first and fourth Purkinje images comprise images of an orthogonal slit.

6. An eye tracker in accordance with claim 5 wherein said detecting means comprises a rotating disc having a plurality of pairs of orthogonal slits and adapted to scan said first and fourth Purkinje images while rotating, and a photo detector spaced from said rotating disc whereby portions of said first and said fourth Purkinje images are passed through said plurality of pairs of orthogonal slits and fall on said photo detector.

7. An eye tracker in accordance with claim 6 wherein one slit in each of the pairs of orthogonal slits scans a portion of both the first and fourth Purkinje images and whereby the time between said one slit scanning the one portion of the fourth Purkinje image and the one portion of the first Purkinje image is proportional to the spatial horizontal separation of said first and fourth Purkinje images and wherein said second slit of each of said pairs of orthogonal slits scans a second portion of said fourth Purkinje image and a second portion of said first Purkinje image whereby the time between said second slit scanning said second portion of said fourth Purkinje image and said second portion of said first Purkinje image is proportional to the spatial vertical separation of said first and fourth Purkinje image.

8. An eye tracker for continuously tracking orientation of an optic axis of an eye having a cornea and a lens where the eye is adapted to translate in a horizontal and a vertical direction and also adapted to rotate in a horizontal and a vertical direction comprising light source means for forming a light beam, optical means for directing said light beam into the eye whereby light reflected by the cornea forms a first Purkinje image and light reflected by the rear of the eye lens forms a fourth Purkinje image, photodetecting means for generating electrical signals in response to said first and fourth Purkinje light images falling thereon, centering means responsive to said electrical signals for centering the first and fourth Purkinje images on said photodetecting means, said centering means developing position signals indicative of the orientation of the optic axis of the eye.

9. An eye tracker in accordance with claim 8 wherein said centering means includes at least one pivoted mirror.

10. An eye tracker in accordance with claim 8 wherein said centering means includes means for moving said photodetecting means with respect to the eye.

11. An eye tracker for continously tracking orientation of an optic axis of an eye having a cornea and a lens where the eye can translate in a horizontal and a vertical direction and also rotate in a horizontal and a vertical direction comprising light source means for flooding the eye with light whereby light reflected by the cornea forms a first Purkinje image and light reflected by the rear of the eye lens forms a fourth Purkinje image, a first Purkinje image detector having an electrical output and a fourth Purkinje image detector having an electrical output, positioning means responsive to said electrical output of one of said first and fourth Purkinje image detectors for adjusting the horizontal position of said one of said first and fourth Purkinje image detectors so as to horizontally center one of said first and fourth Purkinje images thereon, additional positioning means responsive to said electrical output of said other of said first and fourth Purkinje image detectors for adjusting the vertical position of said other of said first and fourth Purkinje image detectors so as to vertically center the other of said first and fourth Purkinje images thereon, said positioning means and said additional positioning means generating electrical position signals indicative of the position of said first and fourth Purkinje image detectors, which electrical position signals contain information about the orientation of the optic axis of the eye.

12. An eye tracker in accordance with claim 11 wherein said light source means comprises an infrared light source.

13. An eye tracker in accordance with claim 11 wherein said first and fourth Purkinje image detectors comprise multiple field photodetectors.

14. An eye tracker in accordance with claim 11 wherein said positioning means and said additional positioning means comprise servosystems.

15. An eye tracker in accordance with claim 11 including a pivoted reflecting surface for reflecting the first and fourth Purkinje images to said first and fourth Purkinje image detectors and including reflecting surface servo means responsive to said electrical outputs of said first and fourth Purkinje image detectors for adjusting the position of said reflecting surface, said servo means generating electrical position signals indicative of the position of said reflecting surface, which electrical position signals contain information about the orientation of the optic axis of the eye.

16. An eye tracker in accordance with claim 15 wherein said reflecting surface servo means adjust the position of said pivoted reflecting surface in one direction so that one of said first and fourth Purkinje images is horizontally centered on one of said first and fourth Purkinje image detectors and wherein said reflecting surface servo means adjusts the position of said pivoted reflecting surface in another direction so that the other of said first and fourth Purkinje images is vertically centered on the other of said first and fourth Purkinje image detectors.

* * * * *